K. RUSHTON.
ELECTRIC LOCOMOTIVE.
APPLICATION FILED JAN. 8, 1921.
1,411,185.
Patented Mar. 28, 1922.
3 SHEETS—SHEET 1.
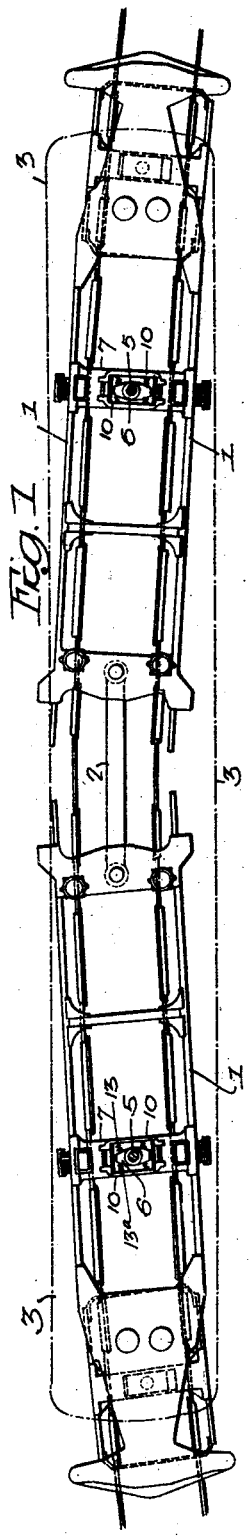
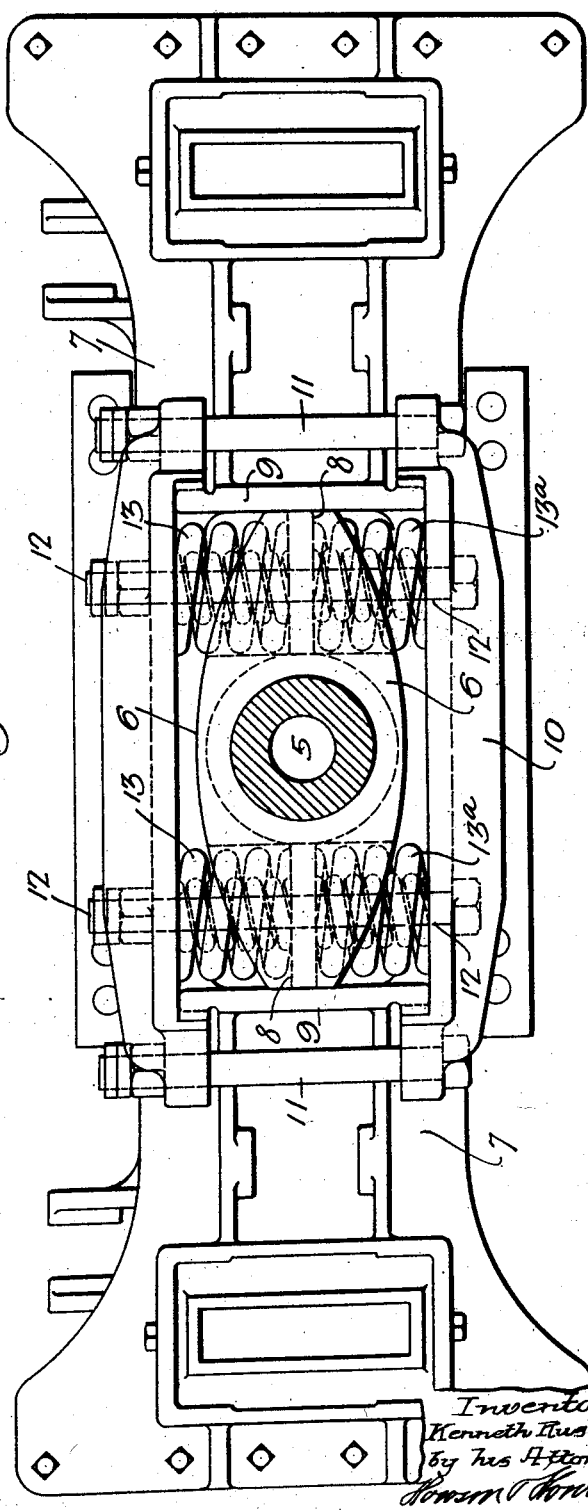
Inventor—
Kenneth Rushton
by his Attorneys

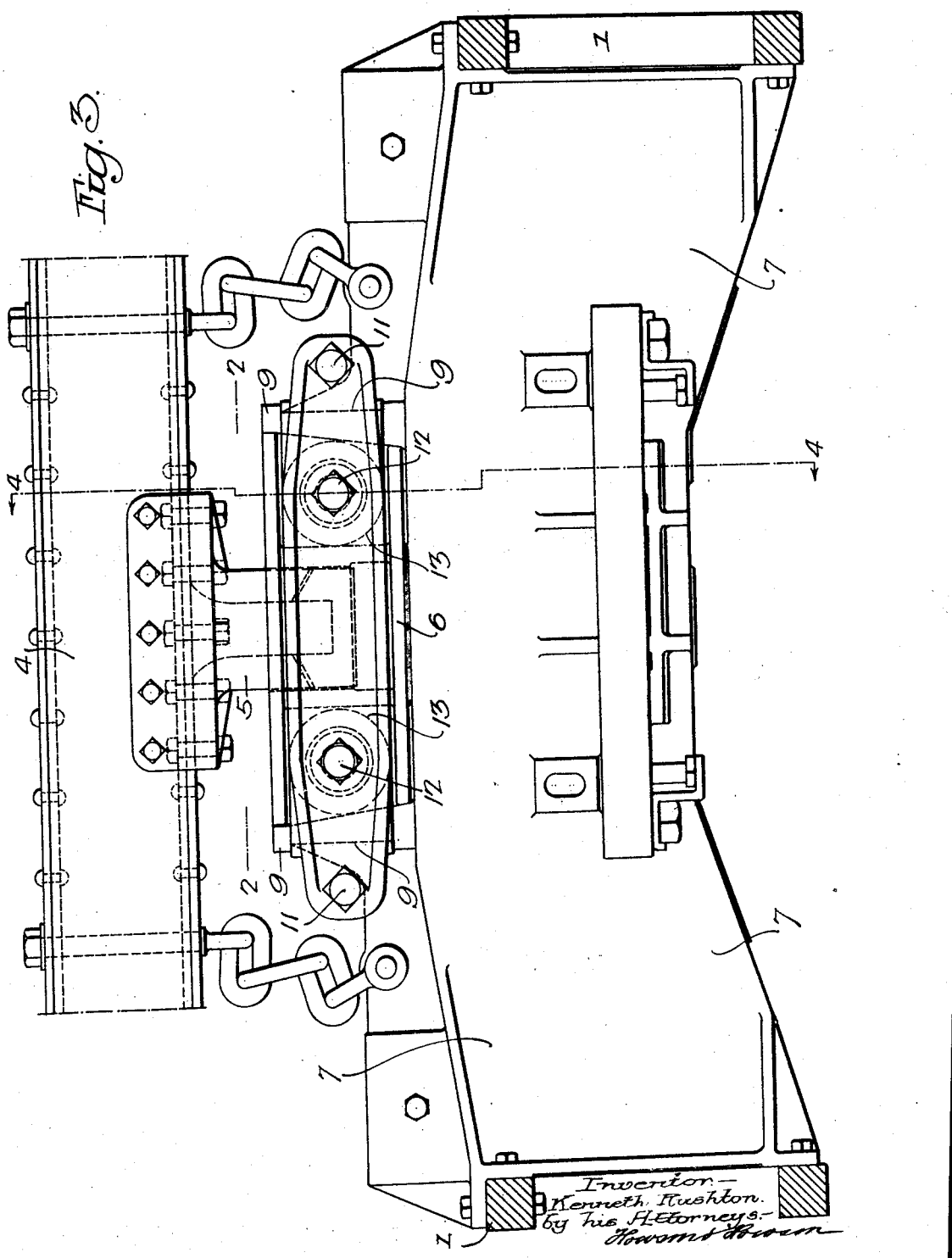

K. RUSHTON.
ELECTRIC LOCOMOTIVE.
APPLICATION FILED JAN. 8, 1921.

1,411,185.

Patented Mar. 28, 1922.
3 SHEETS—SHEET 3.

Inventor-
Kenneth Rushton.
by his Attorneys
Howsen & Howsen

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

ELECTRIC LOCOMOTIVE.

1,411,185. Specification of Letters Patent. Patented Mar. 28, 1922.

Application filed January 8, 1921. Serial No. 435,844.

*To all whom it may concern:*

Be it known that I, KENNETH RUSHTON, a citizen of the United States, residing in Philadelphia, Pennsylvania, have invented certain Improvements in Electric Locomotives, of which the following is a specification.

This invention relates to certain improvements in electric locomotives where the cab extends over two trucks and in which the trucks are connected by a long draw bar.

The object of the invention is to yieldingly connect the pivot pins of the cab to the trucks so that the end pressure will not be taken through the cab but through the trucks and draw bar.

This object I attain in the following manner, reference being had to the accompanying drawings, in which:

Fig. 1 is a plan view illustrating two trucks of an electric locomotive connected by a draw bar, and showing the cab in dotted lines;

Fig. 2 is an enlarged sectional plan view on the line 2—2, Fig. 3, showing the yielding connection between a truck and the pivot pin projecting from the cab;

Fig. 3 is a side view of the connections shown in Fig. 2; and

Figure 4:
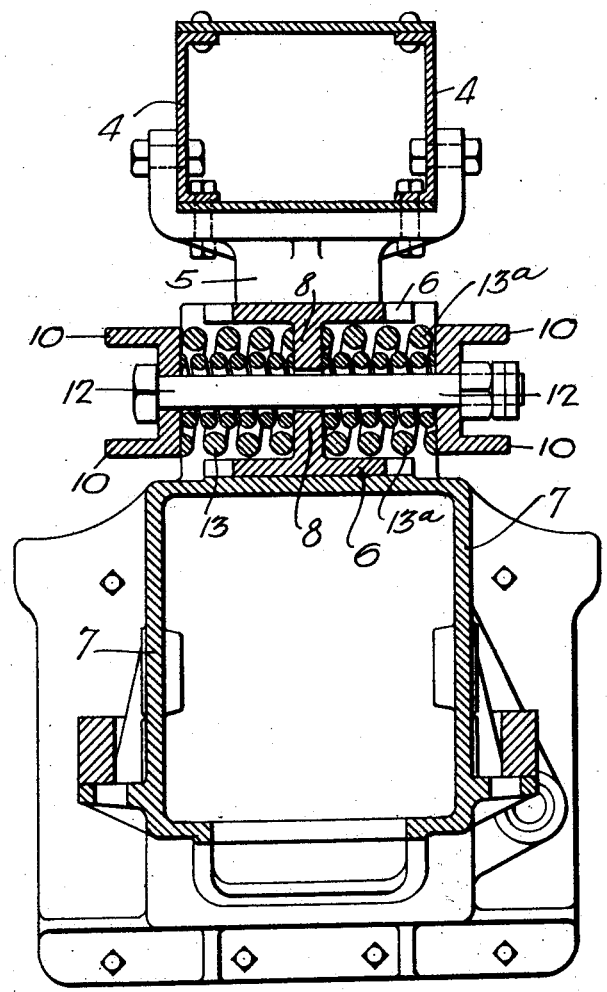
Fig. 4 is a vertical sectional view on the line 4—4, Fig. 3.

1, 1 are two trucks, of any suitable design, for use in connection with an electric locomotive. The inner end of one truck is connected to the inner end of the other truck by a long draw bar 2. The cab 3, shown by dotted lines in Fig. 1, has cross beams 4, Figs. 3 and 4, to which are secured the pivot pins 5. These pivot pins extend into bearings 6 mounted on the cross bars 7 of the trucks 1. These bearings are shaped, as shown in Fig. 2, and have a wing 8 at each side. The bearing is located between end plates 9 secured to or forming part of the cross beams 7 of the trucks. At each end of each plate is a bearing bar 10. These bars are connected together by bolts 11 at the extreme ends and intermediate plates which extend through coiled springs 13 and 13ᵃ and through a wing 8, as clearly shown in Fig. 4. In the present instance, there are two sets of coiled springs on each side of the web, the heavy springs being on the outside and the light springs being on the inside. It will be understood that the arrangement of the springs may be varied without departing from the essential features of the invention.

As shown in Fig. 2, there are springs on each side of each wing 8 of the bearing 6 so that in the event of end pressure on the trucks the springs will yield and the pressure will be taken by the trucks and the draw bar, while the pivots of the cab and the bearings 6 will accommodate themselves to the movement of the trucks. Furthermore, when the locomotive is passing around a curve, as shown in Fig. 1, there will be no binding on the pivots of the cab, as the springs at the bearings will yield so that the trucks will readily accommodate themselves to the curve, the cab passing freely around the curve without binding at the pivots.

While I prefer to locate the yielding bearing on each truck, in some instances, one of the trucks may be provided with a fixed bearing pivoted to receive a pivot pin projecting from the cab, while the other truck will carry a yielding bearing supported by the side springs, as hereinbefore described, so that any variation in the distance between the centers of the pivot pins on the cab and the centers of the bearings on the trucks will be equalized by the movement of the one bearing. I prefer, however, to provide a yielding bearing on both trucks.

It will also be understood that, in some instances, the yielding bearings may be carried by the cab and the pivot pins will project from the trucks without departing from the main features of the invention.

I claim:

1. The combination of two trucks; a draw bar connecting the trucks; a cab extending over both trucks; pivot connections between the cab and each of the trucks; and springs located between each pivot and one of said parts, whereby end pressure will be taken through the trucks and draw bar.

2. The combination in an electric locomotive, of two trucks; a draw bar connecting the trucks; a cab mounted above both trucks; a pivot pin projecting from the cab; springs carried by the trucks; and a center bearing plate mounted between the springs and into which the pivot pin extends so that any end pressure on the trucks will be taken by the trucks and draw bar and not by the cab.

3. The combination of two trucks; a draw bar connecting the trucks; a cab extending over both trucks; two pivot pins projecting from the cab; bearings for the pivot pins, said bearings being carried by the trucks; and springs located between one of said bearings and its truck so that any end pressure will be taken by the trucks and draw bar and not by the cab.

4. The combination in an electric locomotive, of two trucks; a draw bar connecting the inner ends of each truck; a center bearing mounted on each truck, said center bearing having a wing at each side; an enclosure on the truck for the center bearing; a spring on each side of each wing and bearing against the walls of the enclosure; and a cab extending over both trucks and having a depending pivot pin extending into each center bearing, the parts being so arranged that the end pressure on the trucks will be taken by the trucks and by the draw bar and not by the cab.

5. The combination of a truck having a cross bar at the center; end plates projecting up from the cross bar; a bearing bar at each end of the end plates forming an enclosure; a bearing loosely mounted in the enclosure, said bearing having a wing at each side; coiled springs mounted between each side of each wing and the bars; plates extending through the two bars, a wing and two springs; and a cab mounted above the trucks and having a depending pivot pin.

KENNETH RUSHTON.